Apr. 24, 1923.

C. L. STOKOE 1,452,899

FLUID FLOW CONTROLLED SAFETY APPARATUS

Filed Jan. 27, 1920

INVENTOR:
Charles Leslie Stokoe
By Wm Wallace White
ATTY.

Patented Apr. 24, 1923.

1,452,899

UNITED STATES PATENT OFFICE.

CHARLES LESLIE STOKOE, OF WALLSEND-ON-TYNE, ENGLAND.

FLUID-FLOW-CONTROLLED SAFETY APPARATUS.

Application filed January 27, 1920. Serial No. 354,335.

*To all whom it may concern:*

Be it known that I, CHARLES LESLIE STOKOE, a subject of the King of Great Britain and Ireland, residing at Wallsend-on-Tyne, in the county of Northumberland, England, have invented new and useful Improvements in Fluid-Flow-Controlled Safety Apparatus, of which the following is a specification.

This invention relates to fluid-flow controlled safety apparatus, and more particularly to that type of safety apparatus actuated on the failure or commencement of the flow of a fluid through a pipe, and has for its object to provide automatic apparatus for operating indicating or safety devices on said failure or commencement.

Apparatus in accordance with this invention comprises a movable member within the pipe through which the fluid flows extending transversely across said pipe, a resilient resistance against the action of which said movable member is moved by the fluid, said movable member automatically resuming its position across the pipe on failure of the flow of fluid through the pipe, means for transmitting the movement of said movable member to the exterior of the pipe, and means outside the pipe actuated by said movement for operating indicating devices upon the failure or commencement of the flow of fluid through the pipe. The movable member is in the form of a flap valve adapted to be moved against the action of a weighted lever or spring. The movement of the valve rotates a spindle extending to the exterior of the pipe, and the rotation of said spindle is used to operate, through a switch, indicating devices on the failure or commencement of the flow of fluid through the pipe.

The apparatus of the present invention is applicable generally to pipes through which liquids or gases flow where it is desirable that indicating devices should be automatically operated when the flow fails or when the flow commences. It may, for example, be applied to the cooling-water supply pipes of air compressors, condensers, water-cooled gas and oil engines, to the pipes through which flow liquids used in chemical plants, or brine in refrigerating plants, or liquid fuel for internal combustion engines, or lubricating oil for engine bearings or gearing. It may also be applied to steam pipes.

I will fully describe my invention with reference to the accompanying drawings wherein—

Figure 1:
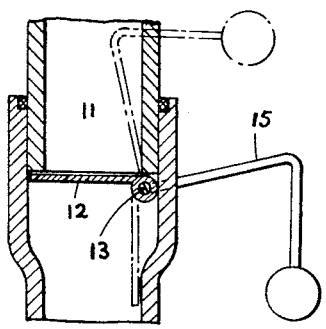
Figure 1 is a central vertical section of a pipe fitted with one form of my apparatus.
Figure 2:
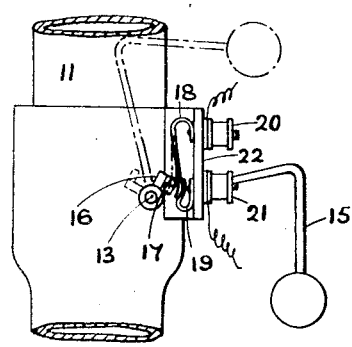
Figure 2 is an elevation of the apparatus outside the pipe.
Figure 3:
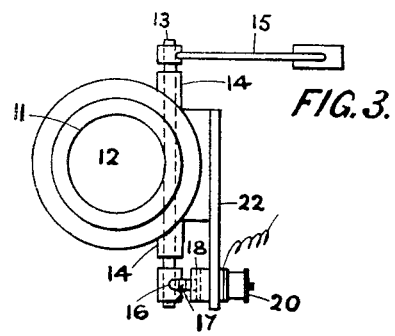
Figure 3 is a plan of Fig. 2.

Referring first to Figs. 1, 2 and 3, in the embodiment of my invention therein illustrated, 11 is the pipe through which the fluid flows. Within the pipe 11 I provide a flap valve 12 fixed on a spindle 13 passing through bearings 14 on the pipe 11 to the exterior thereof where it is fitted at one side with a weighted lever 15 and at the other side with a lever 16 carrying a block 17 of insulating material. 18, 19 are resilient switch members, normally out of contact, provided with terminals 20, 21 mounted on a block 22 of insulating material attached to the pipe 11.

It will be seen that, when no fluid is flowing through the pipe 11, the weighted lever 15 holds the flap valve 12 closed and presses the block 17 against the switch member 18 and the latter into contact with its complementary member 19 thus closing the switch. When however fluid flows through the pipe 11 the flap valve 12 is moved and held open by the fluid striking it, thus rotating the spindle 13 against the action of the lever 15 and moving the block 17 away from the switch member 18 which breaks contact with the member 19, the weighted lever being balanced by the weight of the fluid on the flap valve 12. The position of the moving parts when fluid is flowing through the pipe is indicated in dot-and-dash lines in Figs. 1 and 2. Immediately however the flow of fluid ceases, the parts resume their original positions and the block 17 holds the switch closed.

The switch 18, 19 may be in the circuit of an electric bell or other audible alarm or of an electric lamp or other visible indicator in which case, when the switch is in the form shown in Figs. 2 and 3, the alarm or indicator will be actuated on failure of the flow of fluid through the pipe 11. Or the switch shown in Figs. 2 and 3 may be in the circuit of a solenoid adapted, when energized, to open a valve which may, for example, be the usual unloading valve of an air compressor, in which case my apparatus, if arranged in the cooling-water supply pipe of the compressor, acts as a safety device and automatically prevents damage to the compressor by overheating when the cooling-water supply fails. Or my apparatus may be arranged in the cooling-water supply pipe of the cylinder jackets of a gas or oil engine and the switch arranged in the ignition circuit of the engine, in which case the engine will be automatically stopped when the cooling-water supply fails.

The above applications are given as examples of the many ways in which the switch members 18, 19 can be employed to automatically actuate alarm, indicating or safety devices on failure or commencement of the flow of fluid through the pipe 11.

In the case of air compressors or pumps driven by an electric motor, the circuit in which the switch 18, 19 and the electric bell or indicating device are arranged, is preferably a shunt circuit from the motor terminals. The adoption of this arrangement ensures that the safety apparatus is operative immediately the air compressor or pump commences working and remains operative so long as it is working.

What I claim as my invention, and desire to secure by Letters Patent is:—

A circuit closer for safety apparatus actuated on the failure or commencement of the flow of fluid through a pipe, comprising, in combination, a pipe, a spindle extending transversely through said pipe at one side thereof, a flap valve fixed on said spindle within said pipe and normally held open by fluid flowing through the pipe, a weighted lever on said spindle outside the pipe tending to cause the flap valve to assume a position in which it extends transversely across the pipe in the path of fluid flowing therethrough, an arm on said spindle outside the pipe, a block of insulating material on said arm, a supporting member of insulating material fixed on the outside of the pipe, and a pair of resilient switch members mounted on said supporting member, said switch members being operated by the block of insulating material on the arm on the valve spindle upon rotation of said spindle upon failure or commencement of the flow of fluid through the pipe.

In testimony whereof I have signed my name to this specification.

CHARLES LESLIE STOKOE.